United States Patent
Kim et al.

(10) Patent No.: US 11,660,764 B2
(45) Date of Patent: May 30, 2023

(54) ROBOT JOINT DEVICE

(71) Applicants: KOREA UNIVERSITY OF TECHNOLOGY AND EDUCATION INDUSTRY-UNIVERSITY COOPERATION FOUNDATION, Cheonan-si (KR); NAVER LABS Corporation, Seongnam-si (KR)

(72) Inventors: Yong Jae Kim, Cheonan-si (KR); Jong In Kim, Cheonan-si (KR); Jun Suk Yoon, Daejeon (KR)

(73) Assignees: NAVER Corporation, Gyeonggi-do (KR); KOREA UNIVERSITY OF TECHNOLOGY AND EDUCATION INDUSTRY-UNIVERSITY COOPERATION FOUNDATION, Chungcheongnam-do (KR)

(*) Notice: Subject to any disclaimer, the term of this patent is extended or adjusted under 35 U.S.C. 154(b) by 427 days.

(21) Appl. No.: 16/755,592

(22) PCT Filed: Oct. 11, 2018

(86) PCT No.: PCT/KR2018/011962
§ 371 (c)(1),
(2) Date: Apr. 12, 2020

(87) PCT Pub. No.: WO2019/074294
PCT Pub. Date: Apr. 18, 2019

(65) Prior Publication Data
US 2021/0197407 A1    Jul. 1, 2021

(30) Foreign Application Priority Data
Oct. 13, 2017 (KR) .......................... 10-2017-0133268

(51) Int. Cl.
    B25J 17/02    (2006.01)
    B25J 9/10     (2006.01)
    F16H 1/28     (2006.01)
(52) U.S. Cl.
    CPC ........... B25J 17/0283 (2013.01); B25J 9/102 (2013.01); B25J 9/104 (2013.01); F16H 1/28 (2013.01)
(58) Field of Classification Search
    CPC ... B25J 9/102; B25J 9/104; B25J 9/003; B25J 9/0063; B25J 9/0045; B25J 9/0048;
    (Continued)

(56) References Cited
U.S. PATENT DOCUMENTS

| 4,804,220 A * | 2/1989 | Rosheim ............ B25J 15/0009 403/114 |
| 9,630,326 B2 * | 4/2017 | Rosheim ............... B25J 17/00 |

(Continued)

FOREIGN PATENT DOCUMENTS

| CN | 104647367 A | 5/2015 |
| CN | 106078800 A | 11/2016 |

(Continued)

OTHER PUBLICATIONS

Chinese Office Action dated Sep. 8, 2022 issued in Chinese Patent Application No. 201880066783.X.

Primary Examiner — Bobby Rushing, Jr.
(74) Attorney, Agent, or Firm — Harness, Dickey & Pierce, P.L.C.

(57) ABSTRACT

A robot joint device including first and second plates positioned in parallel, links each having a first end connected to the first plate and a second end connected to the second plate, connecting members configured to connect the two first and second ends of each of the links and the first and second plates, respectively, so that angles and rotations of (Continued)

the links are adjustable relative to the first and second plates, a rotary shaft having two ends penetrating the first and second plates and rotatably installed, a gear reduction unit installed in the first plate and connected to the first end of the rotary shaft, and a pulley connected to the second end of the rotary shaft and configured to transmit driving power to the rotary shaft may be provided.

9 Claims, 13 Drawing Sheets

(58) Field of Classification Search
CPC .. B25J 9/0051; B25J 17/0283; B25J 15/0213; B25J 15/026
See application file for complete search history.

(56) References Cited

U.S. PATENT DOCUMENTS 9,764,482 B2 * 9/2017 Ilch ..................... B25J 9/0051
2007/0113700 A1 5/2007 Khajepour et al.
2016/0311632 A1* 10/2016 Westermeier ........ B25J 17/0266

FOREIGN PATENT DOCUMENTS

| | | | | | |
|---|---|---|---|---|---|
| CN | 108608063 | A | * | 10/2018 | ............. B23D 79/00 |
| CN | 110480602 | A | * | 11/2019 | ............ B25J 9/0063 |
| DE | 10 2010 029 784 | B3 | | 7/2011 | |
| DE | 102016108257 | A1 | * | 11/2017 | |
| DE | 102016115602 | A1 | * | 3/2018 | |
| EP | 2799190 | A2 | * | 11/2014 | ............ B25J 9/0051 |
| JP | 2010-184328 | A | | 8/2010 | |
| JP | 2012045710 | A | * | 3/2012 | ............ B25J 9/0051 |
| JP | 2014-039977 | A | | 3/2014 | |
| JP | 2017-074630 | A | | 4/2017 | |
| JP | 2017074630 | A | * | 4/2017 | ............ B25J 9/0051 |
| KR | 10-0820321 | B1 | | 4/2008 | |
| KR | 10-1052519 | A | | 7/2011 | |
| KR | 10-1401463 | B1 | | 5/2014 | |
| WO | WO-2018114060 | A1 | * | 6/2018 | .............. B25J 9/003 |

* cited by examiner

[FIG. 1]
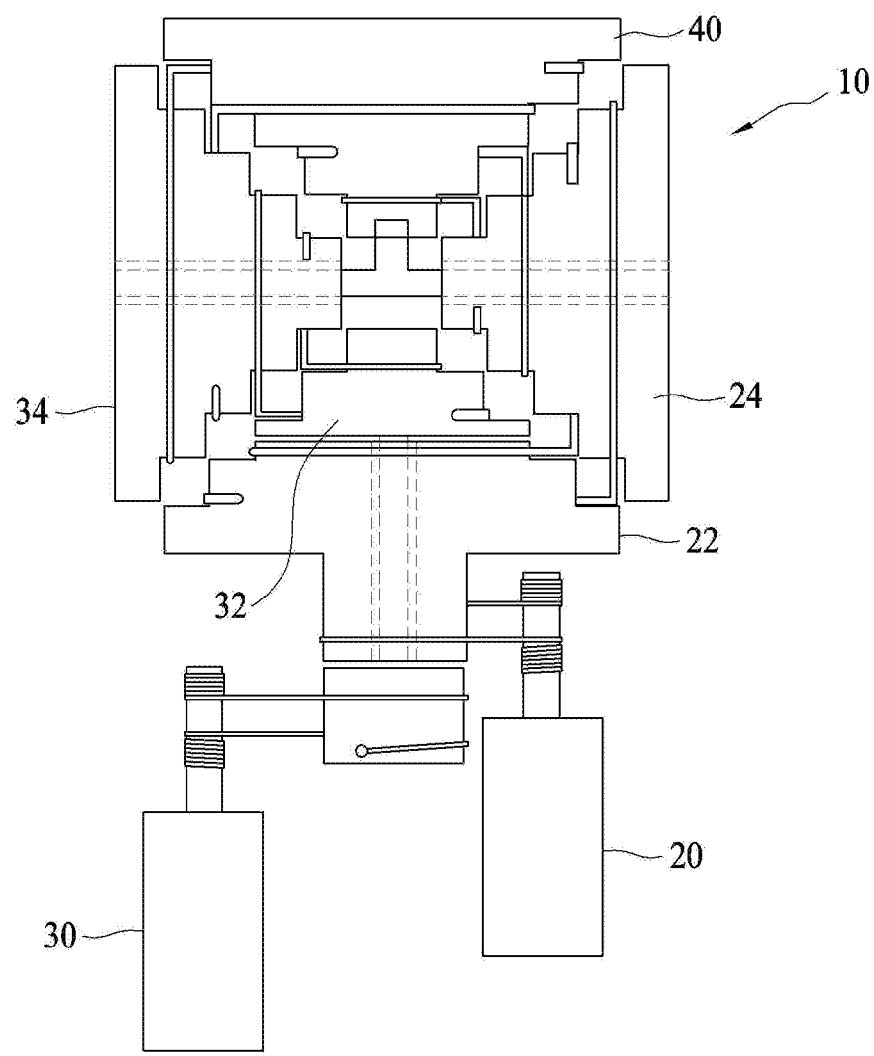

[FIG. 2]
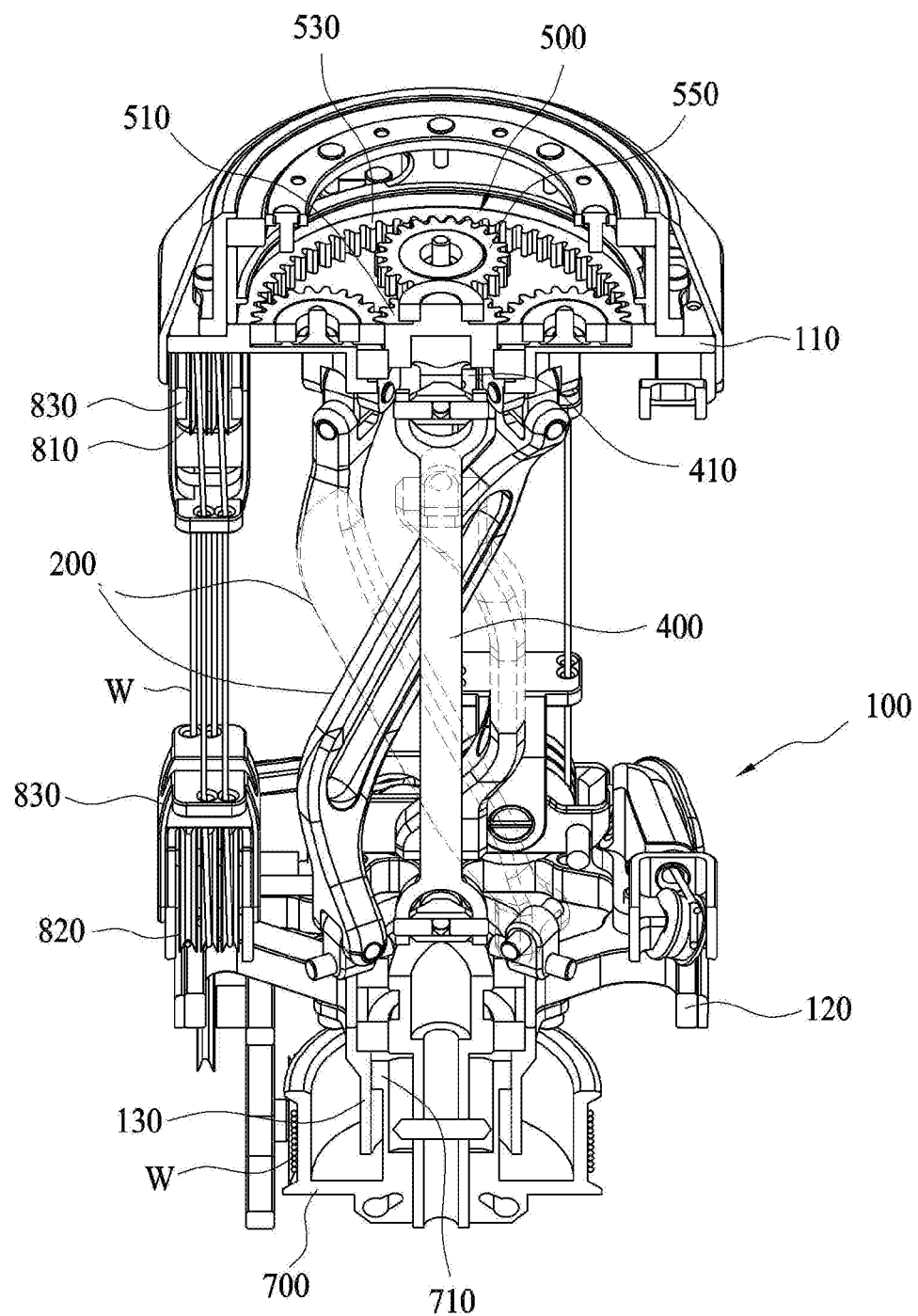

[FIG. 3]
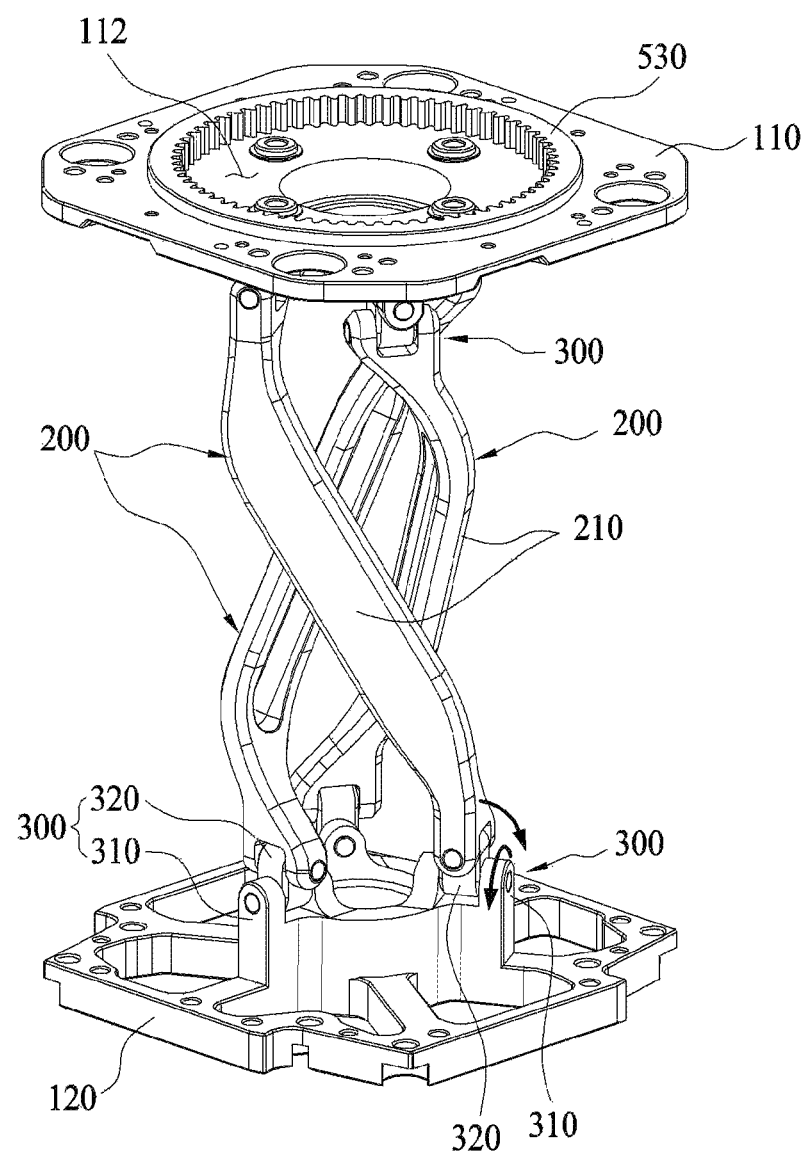

[FIG. 4]
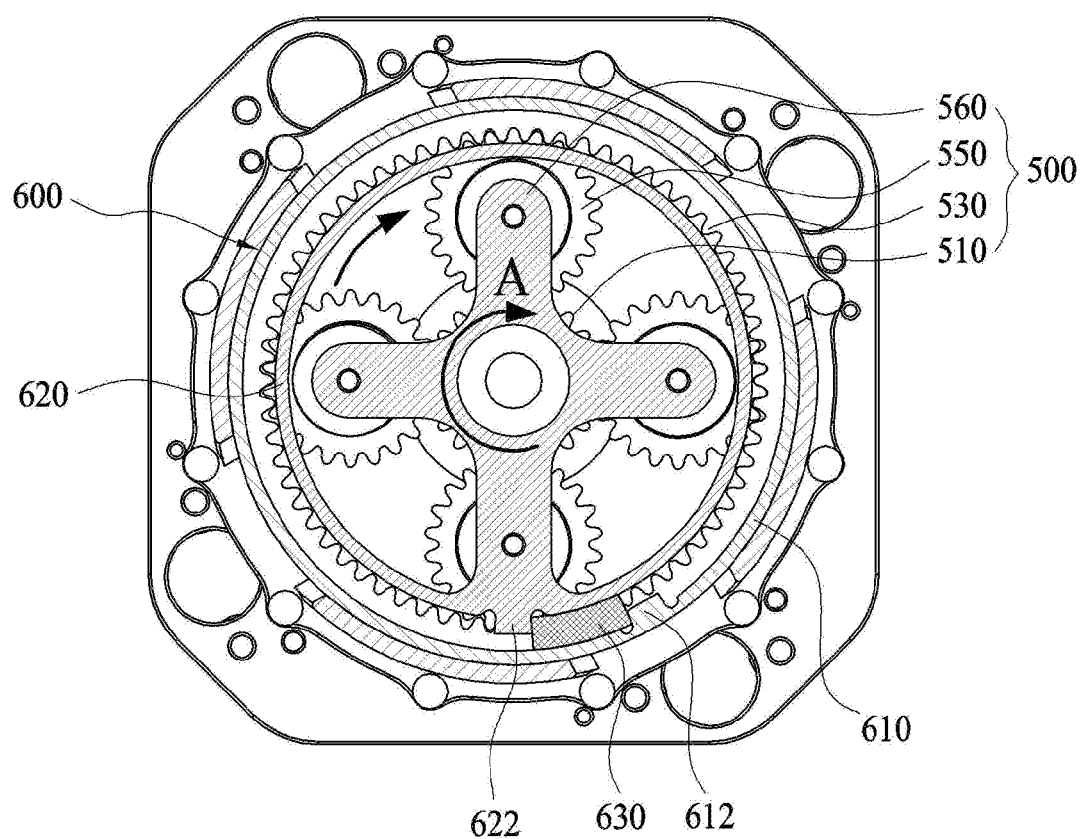

[FIG. 5]
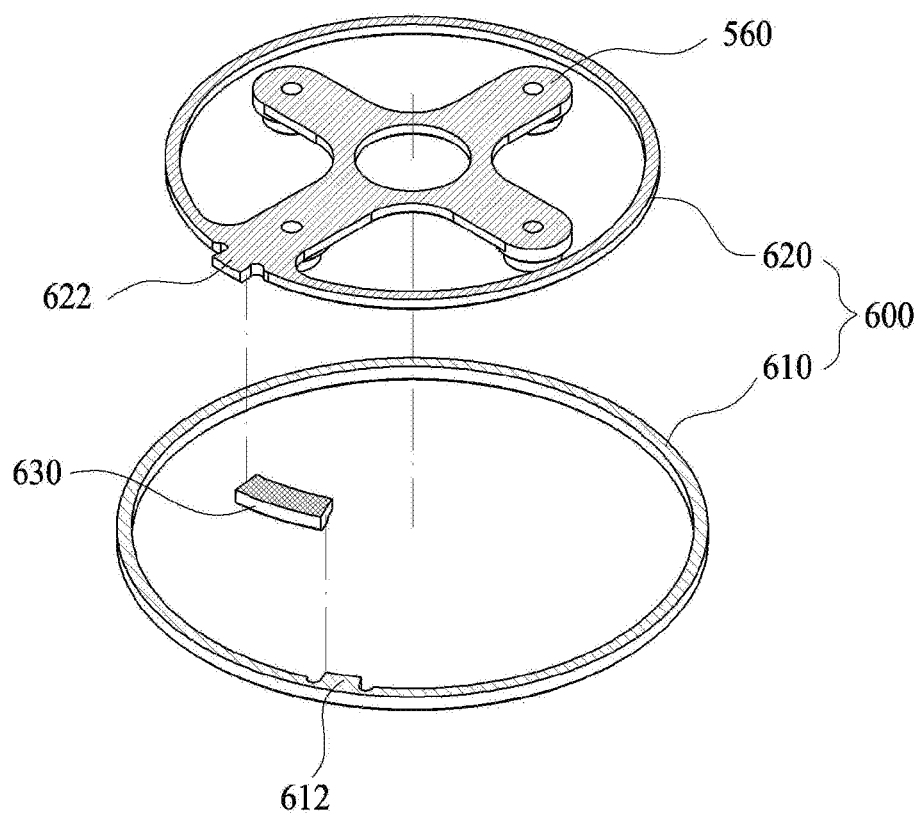

[FIG. 6]
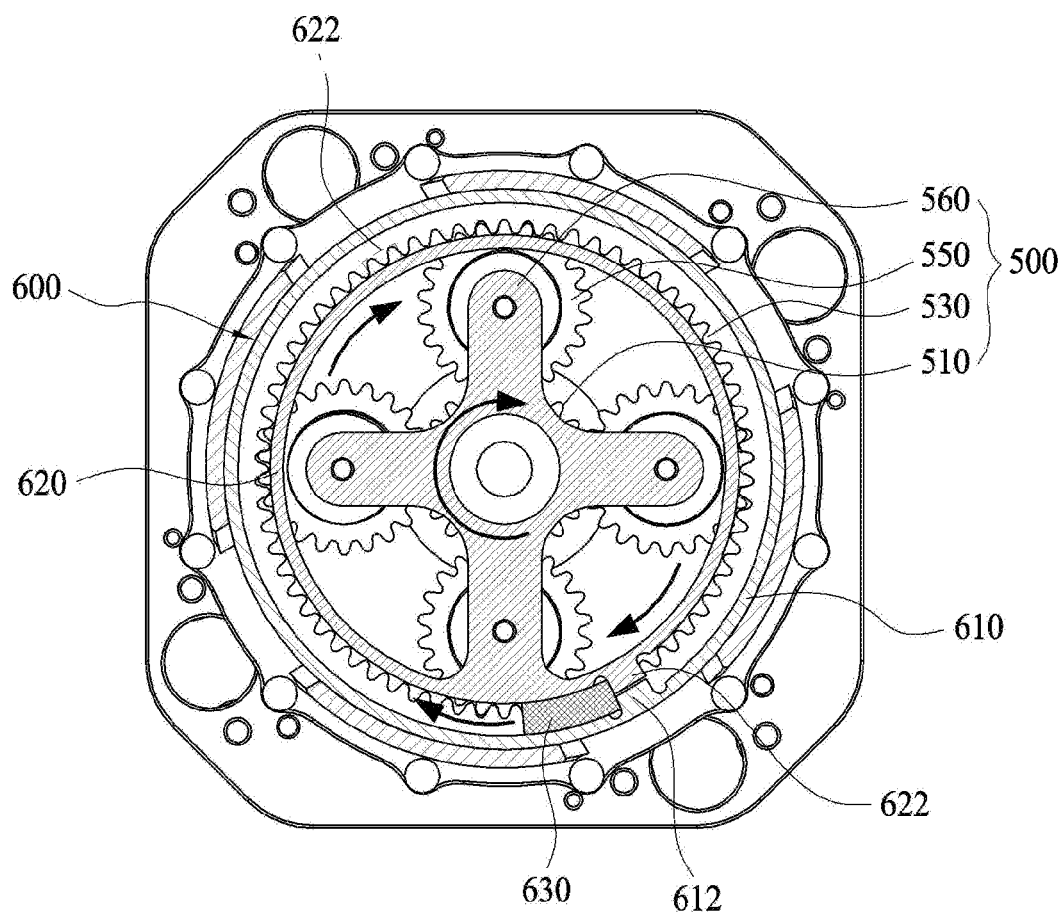

[FIG. 7]
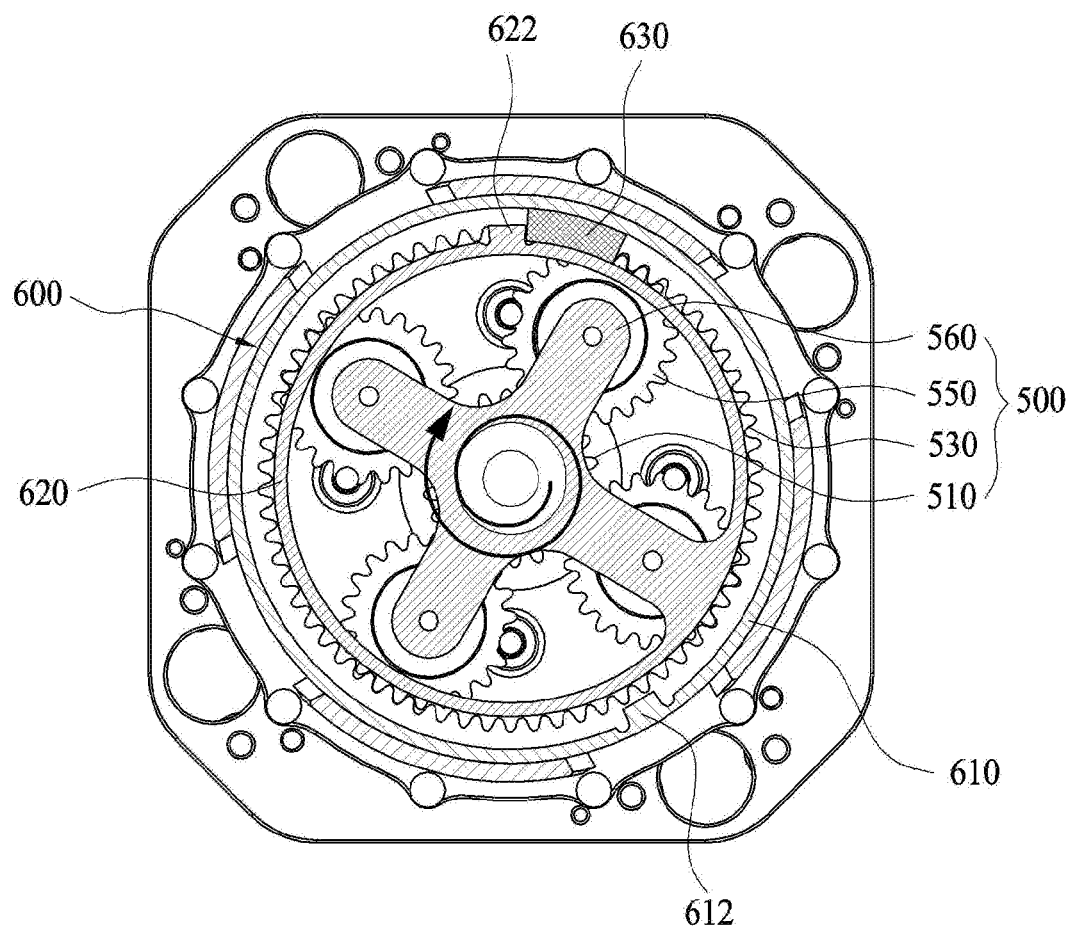

[FIG. 8]
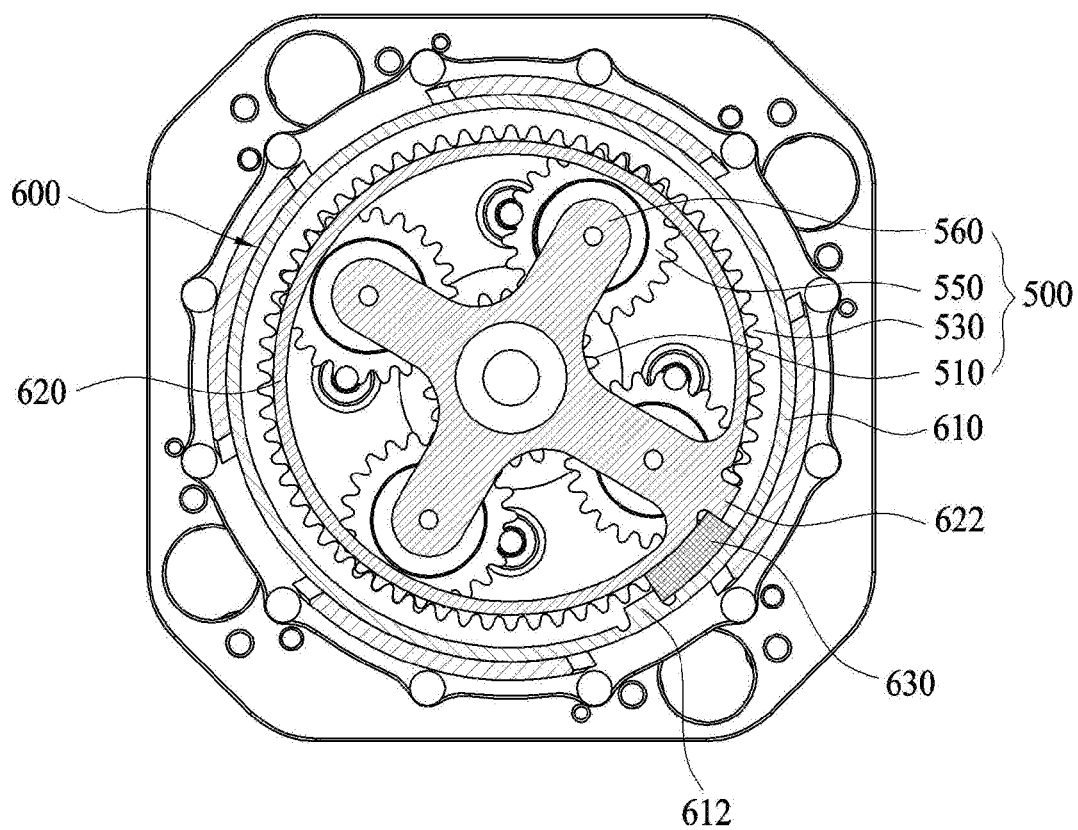

[FIG. 9]
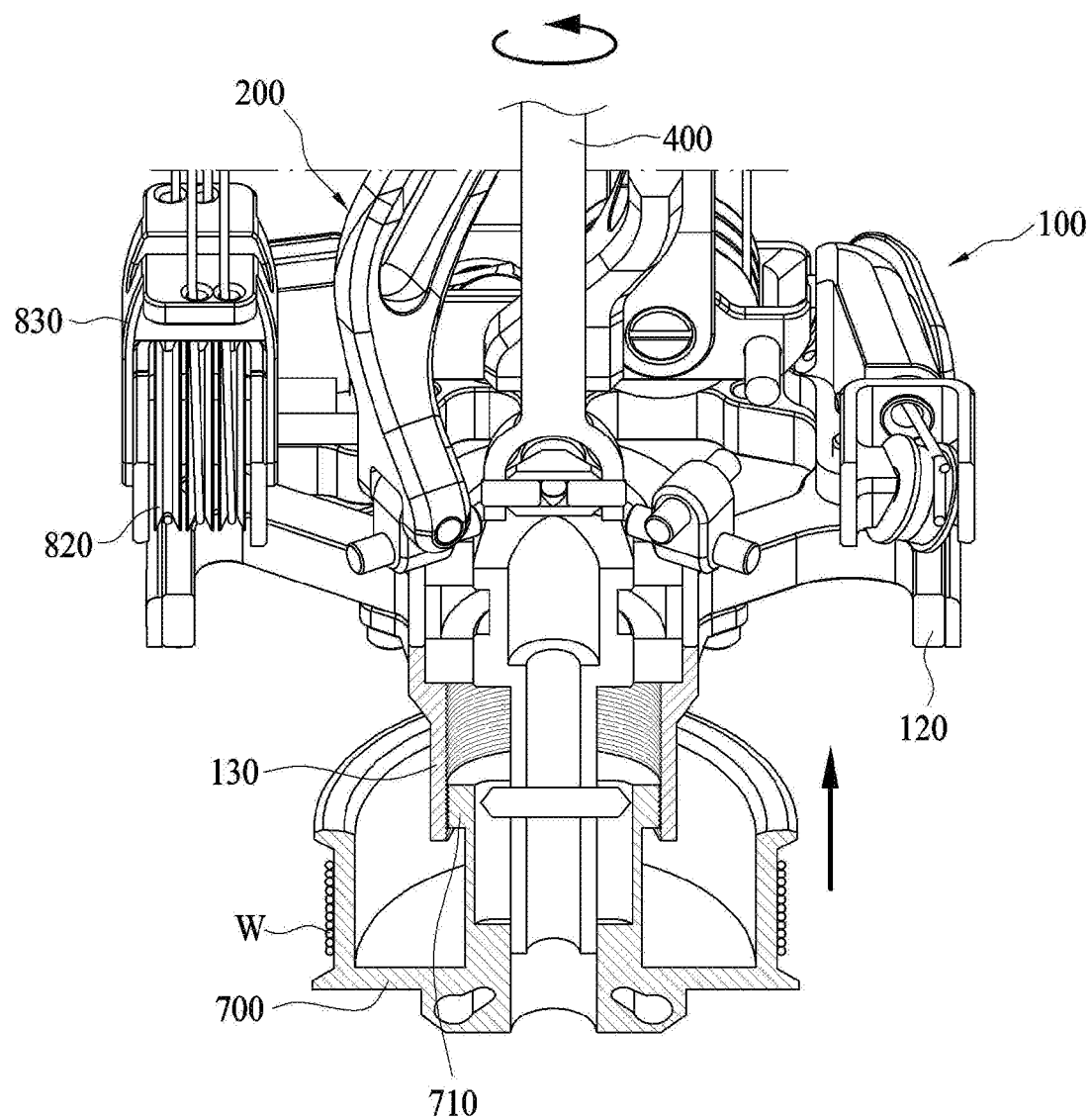

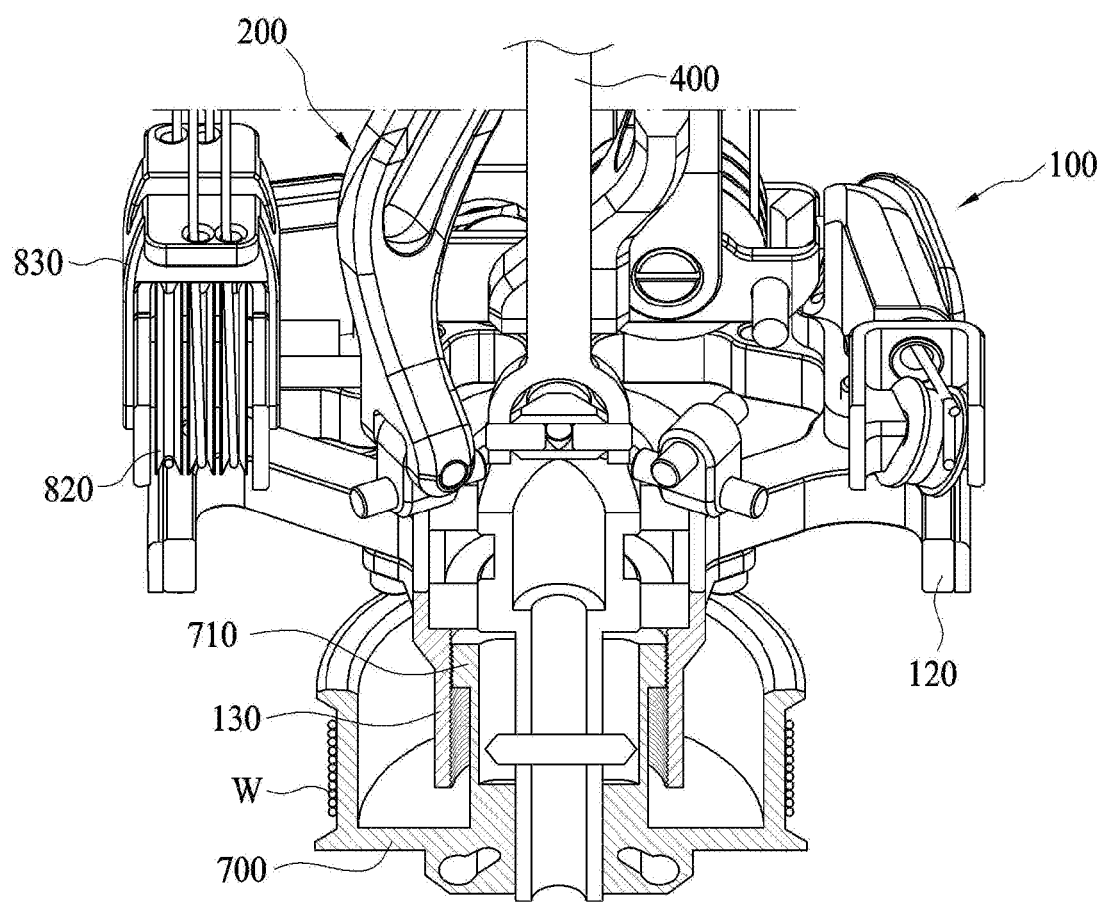
[FIG. 10]

[FIG. 11]
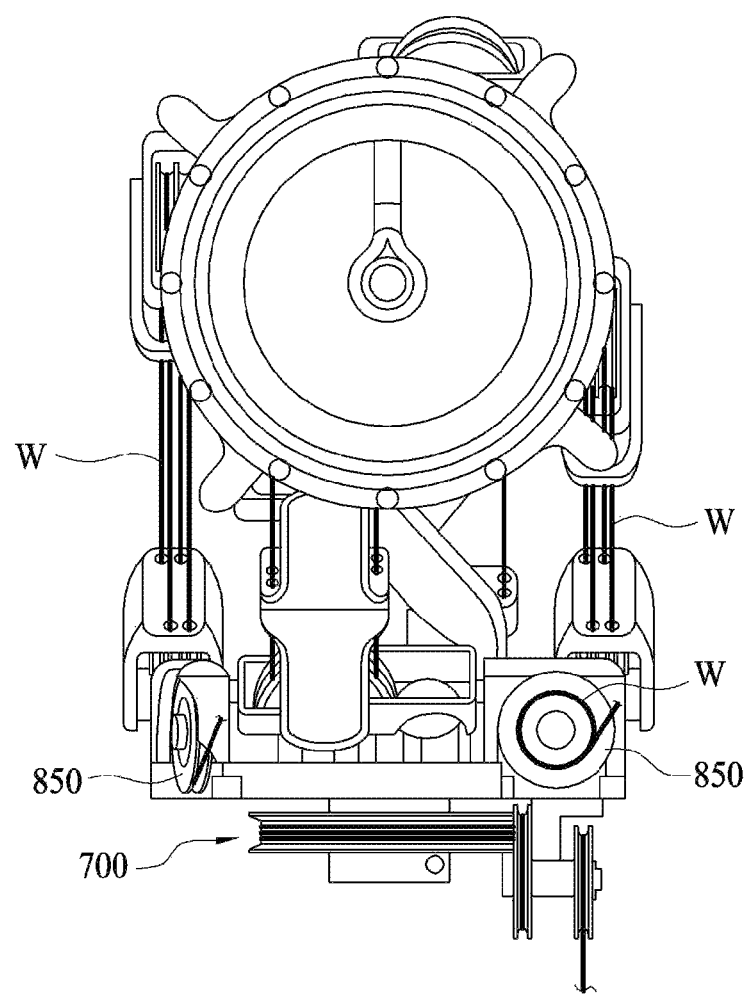

[FIG. 12]
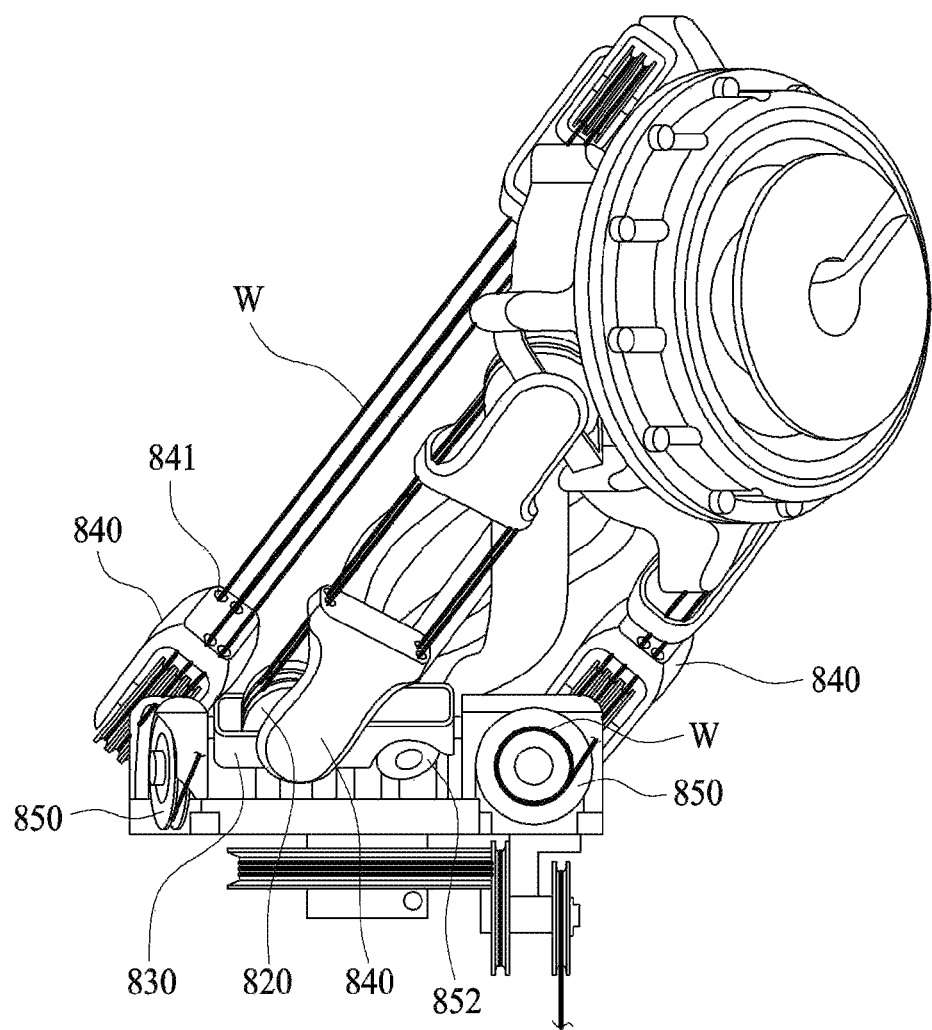

[FIG. 13]
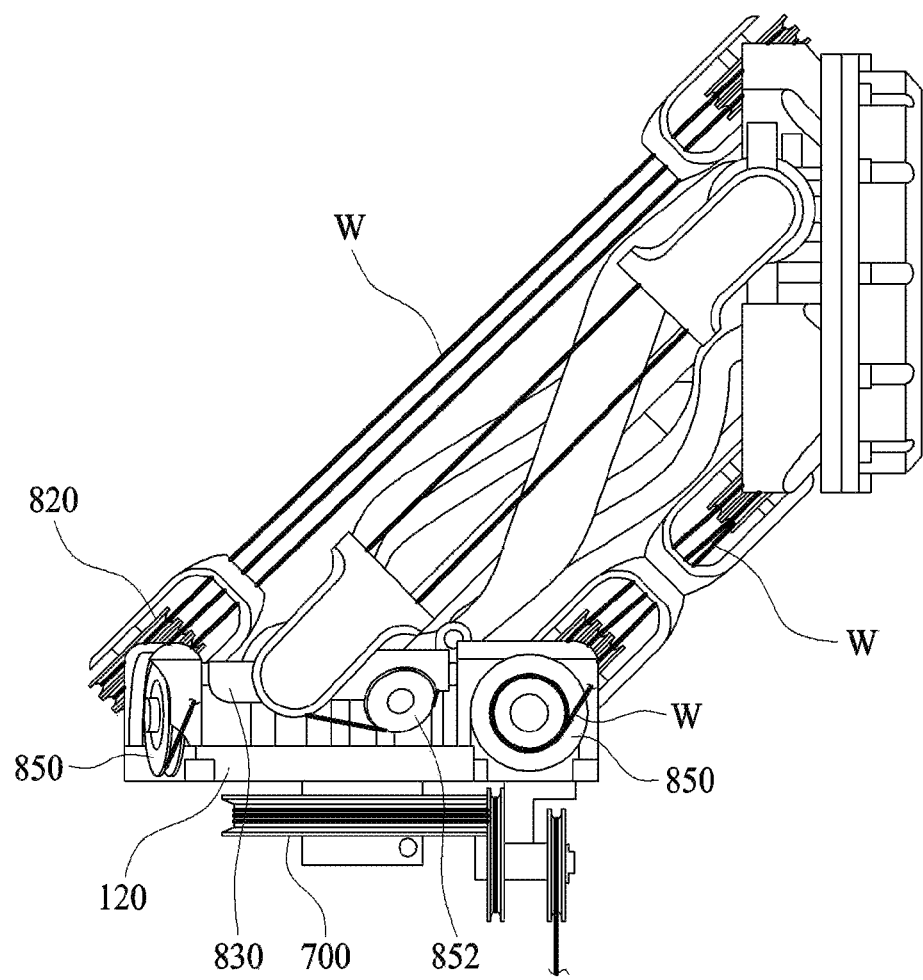

ROBOT JOINT DEVICE

TECHNICAL FIELD

The present invention relates to a robot joint device, and more particularly, to a robot joint device having a parallel link structure and rotation axes provided at a center of the parallel link structure in order to implement motions along the three degrees of freedom, thereby both realizing various joint angles and improving durability.

BACKGROUND ART

The robot developed to date has joints such as a human shoulder joint, an arm joint, an elbow joint, and a wrist joint, and each joint operates at various joint angles. Therefore, such a robot can perform work, movement, and motion while changing the joint angle.

Accordingly, various types of robots are being manufactured, such as a robot that shares a workspace with humans, a surgical robot that facilitates various procedures such as laparoscopic surgery, and an industrial robot that may safely make physical contact with humans.

The robot is equipped with a robot joint device to manipulate the joint. The robot joint device in the related art includes a plurality of gears disposed to be engaged with one another, and a motor configured to operate the gears, thereby manipulating the joint.

In addition, various combinations of motions may be implemented in accordance with types of arrangement of the plurality of gears.

FIG. 1 is a front view illustrating a part of a robot joint device in the related art.

As illustrated in FIG. 1, the robot joint device includes first and second motors 20 and 30 installed in a robot arm 10, a first input body 22 configured to be rotated by the first motor 20, and a second input body 32 installed above the first input body 22 and configured to be rotated by the second motor 30.

The second input body 32 and the first input body 22 are installed to be rotatable about the same rotation axis, and the second input body 32 and the first input body 22 are rotatable independently.

A first rotating body 24, which has a rotation axis perpendicular to the rotation axis of the first input body 22, is installed on the same plane as the rotation axis of the first input body 22.

The second rotating body 34 is installed on the same plane as the rotation axis of the second input body 32, and the second rotating body 34 is symmetrical to the first rotating body 24 with respect to the rotation axis of the first input body 22.

Further, an output body 40 is installed on the plane perpendicular to the rotation axes of the first and second rotating bodies 24 and 34. The output body 40 is provided with a rotation axis perpendicular to the rotation axes of the first and second rotating bodies 24 and 34. The output body 40 may implement a rolling motion or a pitching motion in conjunction with the first and second rotating bodies 24 and 34.

Meanwhile, a pair of cables is installed on the first input body 22 and the second rotating body 34, the first rotating body 24 and the output body 40, the second input body 32 and the second rotating body 34, and the second rotating body 34 and the output body 40, respectively. The pair of cables is wound in different rotation directions.

However, the robot joint device in the related art has a problem in that precision control is difficult and durability deteriorates due to tolerances between gears, and backlash and friction occurring in gear teeth.

In addition, because the robot joint device in the related art has been proposed to implement motions along the two degrees of freedom including the rolling and pitching motions, there is a problem in that there is a restriction on a range of the pitching motion when the robot joint device is applied to implement the pitching motion and a yawing motion.

That is, if the robot joint device in the related art is used to implement the pitching motion and the yawing motion, the output body 40 comes into contact with the first input body 22 and the second input body 32 while the output body 40 performs the pitching motion. Therefore, a range in which the output body 40 may perform the pitching motion is restricted to 0 degree to about 150 degrees, as a result of which it is impossible to implement the motions in various angular directions.

Accordingly, there is a need for a robot joint device capable of both realizing various joint angles and improving durability.

Meanwhile, the related art of the present invention was published on Korean Patent No. 10-1052519 (registered on Jul. 22, 2011).

DISCLOSURE

Technical Problem to be Solved

The present invention has been made in an effort to solve the above-mentioned problems, and an object of the present invention is to provide a robot joint device having a parallel link structure and rotation axes provided at a center of the parallel link structure in order to implement motions along the three degrees of freedom, thereby both realizing various joint angles and improving durability.

Technical problems of the present invention are not limited to the aforementioned technical problems, and other technical problems, which are not mentioned above, may be clearly understood by those skilled in the art from the following descriptions.

Technical Solutions

In order to achieve the above-mentioned object, a robot joint device according to an exemplary embodiment of the present invention includes: first and second plates positioned in parallel with each other; links each having a first end connected to the first plate and a second end connected to the second plate; connecting members configured to connect the two ends of each of the links and the first and second plates, respectively, so that angles and rotations of the links are adjustable relative to the first and second plates; a rotary shaft having two ends penetrating the first and second plates and rotatably installed; a gear reduction unit installed in the first plate and connected to the first end of the rotary shaft; a pulley connected to the second end of the rotary shaft and configured to transmit driving power to the rotary shaft; and a drive unit configured to transmit the driving power to the pulley, in which the plurality of links is installed such that the plurality of first ends and the plurality of second ends are connected to the first and second plates, respectively, and connection points of the first ends and connection points of the second ends each define a polygon.

The plurality of links may be configured such that the polygon defined by the connection points of the first ends and the polygon defined by the connection points of the second ends are coaxially disposed while having the same size and vertices of the polygons are disposed in a staggered manner, such that each of the links twists while extending from the first end to the second end.

The link may extend while twisting and may have an anti-interference bent portion formed at a central portion of the link so as to be spread at a predetermined angle in order to prevent interference with another link.

The gear reduction unit may include: a sun gear connected to the first end of the rotary shaft and configured to rotate together with the rotary shaft; a ring gear fixed in the first plate and disposed concentrically with the sun gear; planet gears installed between the sun gear and the ring gear; and a planetary gear carrier configured to support the planet gears disposed at an equal interval.

The robot joint device may further include: a rotation restricting unit connected to the gear reduction unit and configured to restrict a rotation of the rotary shaft, in which the rotation restricting unit includes: an outer race installed in the first plate and having a first stopper protruding from an inner circumferential surface of the outer race; an inner race positioned inside the inner circumferential surface of the outer race so as to be disposed concentrically with the outer race and having a second stopper formed at one side of an outer circumferential surface thereof, the inner race being connected to the planetary gear carrier and configured to rotate together with the planetary gear carrier; and a moving block slidably disposed between the outer race and the inner race and configured to move together with the second stopper and restrict the rotation of the inner race by being caught by the first stopper.

The two ends of the rotary shaft may be connected to the sun gear and the pulley by means of universal joints, respectively.

The connecting member may include two hinges coupled to be pivotable in perpendicular directions relative to each other.

The robot joint device may further include: first and second winding members provided at positions facing the first and second plates; and a wire wound around the first and second winding members and configured to connect the first and second winding members, in which a first end of the wire is wound around the first and second winding members, a second end of the wire is wound around an outer circumferential surface of the pulley and connected to the drive unit, and a distance between the first and second winding members is changed depending on driving power of the drive unit.

The pulley may have, at a center thereof, a cylindrical portion having an inner circumferential surface coupled to the second end of the rotary shaft, and an outer circumferential surface formed with a screw thread, the second plate may have, at a center thereof, a fastening unit having a screw thread formed on an inner circumferential surface thereof so as to correspond to the screw thread of the cylindrical portion, and the cylindrical portion and the fastening unit may be thread-coupled to each other and may transmit rotational force to the rotary shaft.

A thickness of the wire may be equal to or larger than a pitch of the screw thread of the cylindrical portion.

Other detailed matters of the exemplary embodiment are included in the detailed description and the drawings.

Advantageous Effects

According to the robot joint device according to the exemplary embodiment of the present invention, it is possible to implement various joint angles with the parallel links rotatably installed at angles and the rotary shafts rotatably installed to operate along the three degrees of freedom. Therefore, a motion corresponding to a motion of a human wrist or the like may be implemented realistically, and precise control is enabled without a problem caused by backlash and friction occurring in gear teeth in the related art, thereby improving product durability.

In addition, according to the robot joint device according to the exemplary embodiment of the present invention, the distances between the first and second winding members radially provided based on the links and the length of the wire connecting the first and second winding members may be changed depending on the angles and the rotation directions of the links and the rotary shaft. Therefore, high strength and rigidity may be implemented and precision control may be further improved in comparison with the case in which only the links and the rotary shaft are provided.

The effects of the present invention are not limited to the aforementioned effects, and other effects, which are not mentioned above, will be clearly understood by those skilled in the art from the claims.

BRIEF DESCRIPTION OF DRAWINGS

FIG. 1 is a front view illustrating some components of a robot joint device in the related art.

FIG. 2 is a partial cross-sectional perspective view illustrating a configuration of a robot joint device according to an exemplary embodiment of the present invention.

FIG. 3 is a perspective view illustrating some components of the robot joint device according to the exemplary embodiment of the present invention.

FIG. 4 is a top plan view illustrating a configuration of a gear reduction unit according to the exemplary embodiment of the present invention.

FIG. 5 is an exploded perspective view illustrating a configuration of a rotation restricting unit according to the exemplary embodiment of the present invention.

FIGS. 6 to 8 are top plan views illustrating an operation of the rotation restricting unit according to the exemplary embodiment of the present invention.

FIGS. 9 and 10 are partial cross-sectional views illustrating an operation of a pulley according to the exemplary embodiment of the present invention.

FIGS. 11 to 13 are perspective views illustrating an operation of the robot joint device according to the exemplary embodiment of the present invention.

BEST MODE FOR CARRYING OUT THE INVENTION

In the exemplary embodiment of the present invention, the robot joint device comprises first and second plates positioned in parallel with each other, links each having a first end connected to the first plate and a second end connected to the second plate, connecting members configured to connect the two ends of each of the links and the first and second plates, respectively, so that angles and rotations of the links are adjustable relative to the first and second plates, a rotary shaft having two ends penetrating the first and second plates and rotatably installed, a gear reduction unit installed in the first plate and connected to the first end of the rotary shaft, a pulley connected to the second end of the rotary shaft and configured to transmit driving power to the rotary shaft and a drive unit configured to transmit the driving power to the pulley, wherein the plurality of links is installed such that the plurality of first ends and the plurality of second ends are connected to the first and second plates, respectively, and connection points of the first ends and connection points of the second ends each define a polygon.

MODE FOR CARRYING OUT THE INVENTION

Hereinafter, the exemplary embodiments of the present invention will be described in detail with reference to the accompanying drawings so that those skilled in the art to which the present invention pertains may easily carry out the present invention.

When describing the embodiments, a description of technical contents, which are well known in the technical field to which the present invention pertains but are not directly related to the present invention, will be omitted. This is to more clearly describe the subject matter of the present invention without obscuring the subject matter by omitting any unnecessary description.

Similarly, in the accompanying drawings, some constituent elements are illustrated in an exaggerated or schematic form or are omitted. In addition, a size of each constituent element does not entirely reflect an actual size. Like reference numerals designate like or corresponding elements in the drawings.

FIG. 2 is a perspective view illustrating a configuration of a robot joint device according to an exemplary embodiment of the present invention.

As illustrated in FIG. 2, a robot joint device 100 is provided with a first plate 110 and a second plate 120. As well illustrated in FIG. 3, the first plate 110 and the second plate 120 are positioned in parallel with each other. A predetermined distance is maintained between the first plate 110 and the second plate 120 by links 200 to be described below.

A first installation space 112 is formed at an upper side of the first plate 110. The first installation space 112 is a portion in which a gear reduction unit 500 to be described below is installed.

As illustrated in FIG. 2, a fastening unit 130 is provided at a center of the second plate 120. The fastening unit 130 has an approximately cylindrical shape, and a cylindrical portion 710 of a pulley 700 to be described below is thread-coupled in the fastening unit 130. To this end, a screw thread is formed on an inner circumferential surface of the fastening unit 130 and corresponds to a screw thread of the cylindrical portion 710.

As illustrated in FIGS. 2 and 3, the first and second plates 110 and 120 are connected with the plurality of links 200. In the present exemplary embodiment, each of the links 200 has an approximately bar shape, first ends of the links 200 are connected to the first plate 110, and second ends of the links 200 are connected to the second plate 120.

In the present exemplary embodiment, the number of links 200 is three. The three first ends and the three second ends of the links 200 are connected to the first plate 110 and the second plate 120, respectively, and installed such that connection points of the first ends define a triangle and connection points of the second ends define a triangle.

In this case, the triangle defined by the connection points of the first ends of the links 200 and the triangle defined by the connection points of the second ends have the same size and are coaxially disposed. Further, vertices of the triangles are disposed in a staggered manner. Each of the links 200 twists while extending from the first end to the second end.

As well illustrated in FIG. 3, each of the links 200 extends while twisting, such that an anti-interference bent portion 210, which is spread at a predetermined angle, is formed at a central portion of each of the links 200. The anti-interference bent portion 210 serves to prevent interference between one link 200 and another link 200, that is, between the adjacent links 200.

Meanwhile, as illustrated in FIG. 3, the two ends of each of the links 200 are connected to the first and second plates 110 and 120 by means of connecting members 300, respectively. The connecting member 300 enables a rotation and an angle of the link 200 to be changed with respect to the first and second plates 110 and 120. In the present exemplary embodiment, each of the connecting members 300 may have two hinges 310 and 320 coupled to be pivotable relative to each other in perpendicular directions. With the above-mentioned configuration, the links 200 may operate along the two degrees of freedom, as illustrated in FIGS. 11 to 13.

While the connecting member 300 has the two hinges coupled to be pivotable in the perpendicular directions in the present exemplary embodiment, the present invention is not necessarily limited thereto. For example, the connecting member 300 may be a universal joint for fixing shafts parallel to the link 200 and may be used to implement the two degrees of freedom.

As illustrated in FIG. 2, a rotary shaft 400 is positioned between the first and second plates 110 and 120. In the present exemplary embodiment, the rotary shaft 400 is disposed at a center of the links 200 and positioned in a direction parallel to a longitudinal direction of each of the links 200. Two ends of the rotary shaft 400 penetrate the first and second plates 110 and 120, respectively, such that the rotary shaft 400 is rotatably installed. In the present exemplary embodiment, although not illustrated, the rotary shaft 400 may be rotatably supported on the first and second plates 110 and 120 by means of ball bearings.

In the present exemplary embodiment, the two ends of the rotary shaft 400 are connected to a gear reduction unit 500 and a pulley 700, which will be described below, by means of universal joints 410, respectively. This is to enable the rotary shaft 400 to pivot in the same direction as the links 200, and to transmit driving power, received from the pulley 700, to the gear reduction unit 500. That is, as illustrated in FIGS. 11 to 13, the universal joints 410 enable the rotary shaft 400 to operate along the three degrees of freedom. Because the universal joint 410 is a typical component used to transmit power, a detailed description thereof will be omitted.

In the present exemplary embodiment, the universal joints 410 are used to enable the rotary shaft 400 to operate along the three degrees of freedom, but the present invention is not necessarily limited thereto. For example, a ball joint (not illustrated) may be used.

Meanwhile, as illustrated in FIG. 2, the gear reduction unit 500 is installed in the first installation space 112 of the first plate 110. The gear reduction unit 500 serves to reduce a rotational speed of driving power transmitted from the rotary shaft 400 and transmits the driving power to an object connected to the gear reduction unit 500.

In the present exemplary embodiment, the gear reduction unit 500 may include a sun gear 510, a ring gear 530, and planet gears 550.

The sun gear 510 is connected to the universal joint 410 connected to the first end of the rotary shaft 400, and the sun gear 510 rotates together with the rotary shaft 400.

The ring gear 530 is fixed in the first installation space 112. In the present exemplary embodiment, the ring gear 530 may be formed integrally with the first plate 110. The ring gear 530 and the sun gear 510 are concentrically disposed.

The plurality of planet gears 550 is installed between the sun gear 510 and the ring gear 530. The planet gears 550 rotate while engaging with the sun gear 510 and the ring gear 530.

As illustrated in FIG. 4, the planet gears 550 are supported by a planetary gear carrier 560. The planetary gear carrier 560 serves to support the planet gears 550 disposed at an equal interval.

Meanwhile, a rotation restricting unit 600 may be connected to the gear reduction unit 500. As illustrated in FIG. 4, the rotation restricting unit 600 is installed in the first installation space 112.

As illustrated in FIGS. 4 and 5, the rotation restricting unit 600 may be provided with an outer race 610. The outer race 610 has an approximately ring shape and is installed in the first installation space 112.

A first stopper 612 protrudes from an inner circumferential surface of the outer race 610. The first stopper 612 is a portion by which a moving block 630 to be described below is caught.

An inner race 620 having a ring shape is positioned inside the inner circumferential surface of the outer race 610. The inner race 620 and the outer race 610 are concentrically positioned. The inner race 620 is connected to the planetary gear carrier 560 and rotates together with the planetary gear carrier 560. In the present exemplary embodiment, the inner race 620 may be formed integrally with the planetary gear carrier 560.

A second stopper 622 protrudes at one side of an outer circumferential surface of the inner race 620. The second stopper 622 serves to push the moving block 630 to be described below to slide the moving block 630.

The moving block 630 is slidably disposed between the outer race 610 and the inner race 620. As illustrated in FIG. 6, the moving block 630 moves together with the second stopper 622 and serves to restrict a rotation of the inner race 620 by being caught by the first stopper 612.

That is, as illustrated in FIG. 4, the inner race 620 rotates clockwise, that is, in a direction indicated by the arrow A in a state in which the first stopper 612 is positioned at the left side of the moving block 630 and the second stopper 622 is positioned at the right side of the moving block 630 based on the moving block 630.

In this state, only the first stopper 612 rotates together with the inner race 620 in a state in which the moving block 630 is stationary. In this case, as illustrated in FIG. 6, when the inner race 620 rotates by 360 degrees, the second stopper 622 comes into contact with the moving block 630.

When the inner race 620 still rotates clockwise in this state, the second stopper 622 pushes and moves the moving block 630 clockwise, as illustrated in FIG. 6.

The moving block 630, which is pushed and slid by the second stopper 622 as described above, is caught by the first stopper 612, as illustrated in FIG. 8. At the same time, the inner race 620 does not rotate clockwise any further in a state in which the inner race 620 is rotated by about 720 degrees.

As described above, since the moving block 630 is caught by the first stopper 612 and restricts the rotation of the inner race 620, it is possible to prevent damage when the rotary shaft 400 and the reduction gear unit 500 connected to the rotary shaft 400 abnormally operate.

Meanwhile, as illustrated in FIG. 1, the pulley 700 is connected to the second end of the rotary shaft 400. The pulley 700 is connected to the second end of the rotary shaft 400 and serves to transmit driving power, transmitted from a drive unit (not illustrated), to the rotary shaft 400.

A second end of a wire W to be described below is wound around an outer circumferential surface of the pulley 700. A first end of the wire W is wound around first and second winding members 810 and 820 to be described below, the second end of the wire W is wound around the outer circumferential surface of the pulley 700 and connected to the drive unit (not illustrated). As the second end of the wire W is wound around or unwound from the outer circumferential surface of the pulley 700, the wire W serves to transmit the driving power from the drive unit to the pulley 700.

In the present exemplary embodiment, the cylindrical portion 710 may be provided at the center of the pulley 700. The universal joint 410 coupled to the second end of the rotary shaft 400 is coupled to an inner circumferential surface of the cylindrical portion 710. The cylindrical portion 710 and the fastening unit 130 are thread-coupled to each other and transmit rotational force to the rotary shaft 400.

The screw thread is formed on an outer circumferential surface of the cylindrical portion 710. The screw thread allows the cylindrical portion 710 to be thread-coupled to the fastening unit 130. In this case, a pitch of the screw thread of the cylindrical portion 710 may be equal to or larger than a thickness of the wire W. As illustrated in FIGS. 9 and 10, the position at which the wire W is wound around the outer circumferential surface of the pulley 700 is also moved while the cylindrical portion 710 is thread-coupled to the fastening unit 130. Therefore, the configuration in which the pitch of the screw thread of the cylindrical portion 710 is equal to or larger than the thickness of the wire W allows the wire W to be wound around the outer circumferential surface of the pulley 700 while preventing the parts of the wire W from overlapping one another.

Meanwhile, as illustrated in FIGS. 2 and 11 to 13, the first and second plates 110 and 120 are provided with the first winding members 810 and the second winding members 820, respectively, disposed at positions facing each other. In the present exemplary embodiment, four pairs of first winding members 810 and four pairs of second winding members 820 are provided. The first and second winding members 810 and 820 are radially provided based on the links 200.

The first and second winding members 810 and 820 are connected with the wire W. The first end of the wire W is wound around the first and second winding members 810 and 820, and the second end of the wire W is connected to the drive unit. In this case, the distances between the first and second winding members 810 and 820 are changed depending on changes in angles and rotations of the rotary shaft 400 and the links 200.

As illustrated in FIG. 2, the distances between the first and second winding members 810 and 820 are equal to one another in a state in which the links 200 and the rotary shaft 400 are positioned at the original positions. In this case, when the links 200 and the rotary shaft 400 are inclined forward at an angle, as illustrated in FIG. 11, from the state illustrated in FIG. 2, a length of the wire W, which connects the first and second winding members 810 and 820 at the front side, is decreased, the first and second winding members 810 and 820 at the front side move close to one another, a length of the wire W, which connects the first and second winding members 810 and 820 at the rear side, is increased, and the first and second winding members 810 and 820 at the rear side move away from one another.

As described above, the length of the wire W and the distances between the first and second winding members 810 and 820 may be changed depending on the changes in angles and rotations of the links 200 and the rotary shaft 400, as a result of which strength and rigidity are may be improved and precise control may be improved in comparison with the case in which only the links 200 and the rotary shaft 400 are provided.

As illustrated in FIGS. 12 and 13, when the links 200 and the rotary shaft 400 rotate so that the first plate 110 is directed toward the right side, the length of the wire W, which connects the first and second winding members 810 and 820 at the right side, is decreased, the first and second winding members 810 and 820 at the right side move close to one another, the length of the wire W, which connects the first and second winding members 810 and 820 at the left side, is increased, and the first and second winding members 810 and 820 at the left side move away from one another.

In the present exemplary embodiment, the first end of the wire W is reciprocally wound around the first and second winding members 810 and 820 multiple times. This is to increase tension of the drive unit and rigidity of the wire.

In this case, assuming that the number of times the wires W reciprocate between the first and second winding members 810 and 820 is N, tension T of the drive unit and rigidity K of the wires W are increased to Tout and Kaut in accordance with the following equations between the first and second winding members 810 and 820.

$$T_{out}=NT$$

$$K_{out}=N^2K$$

As shown in the above equations, the tension is increased in proportion to N, and the rigidity is increased in proportion to the square of N. Because the high rigidity is an essential element for precise control, the use of the wire W may compensate for a deterioration in rigidity. In addition, the increase in tension advantageously increases a maximum load.

As illustrated in FIGS. 2 and 11 to 13, the first and second winding members 810 and 820 are pivotably coupled to the first and second plates 110 and 120, respectively, by hinge brackets 830. The hinge brackets 830 are hingedly coupled to the first and second plates 110 and 120, respectively, by hinge pins (not illustrated). The hinge brackets 830 are provided to enable the angles of the first and second winding members 810 and 820 to change in accordance with the angles of the links 200 with respect to the first and second plates 110 and 120.

Wire guides 840 are coupled to the hinge brackets 830. In the present exemplary embodiment, the wire guides 840, together with central shafts (not illustrated) of the first and second winding members 810 and 820, are rotatably coupled to the hinge brackets 830. The wire guides 840 are provided to prevent the wire W, which is wound between the first and second winding members 810 and 820 multiple times, from being entangled.

Each of the wire guides 840 has a through hole 841 penetratively formed in a direction in which the wire W is extended. The through hole 841 is a portion in which the wire W is penetratively positioned.

Meanwhile, as illustrated in FIGS. 11 to 13, direction changing members 850 may be rotatably provided at portions of the second plate 120 which are adjacent to the second winding members 820. The direction changing member 850 is disposed on a route of the wire W extending toward the pulley 700, that is, toward the drive unit and serves to change an extension direction of the wire W.

That is, the direction changing member 850 is provided at a side of the second winding member 820 and may change the direction of the wire W from the second winding member 820 toward a lateral side. As a result, it is possible to prevent the wire W from being withdrawn due to the rotation of the hinge bracket 830.

As illustrated in FIGS. 11 to 13, an auxiliary direction changing member 852 may be further provided between the second winding member 820 and the direction changing member 850. The auxiliary direction changing member 852 serves to allow the wire W to operate more stably.

Meanwhile, the robot joint device 100 is provided with the drive unit (not illustrated). The drive unit may be installed at a position capable of supporting a load, like a shoulder portion or a back portion of a person. The drive unit serves to transmit the driving power to the wire W. As described above, the pulley 700 may be rotated by being supplied with the driving power from the wire W, such that the distances between the first and second winding members 810 and 820 may be changed.

In the present exemplary embodiment, the drive unit is configured as an actuator, but the present invention is not necessarily limited thereto. For example, the drive unit may be configured as a linear motor capable of operating the wire W so that the wire W is linearly movable.

Meanwhile, the exemplary embodiments of the present invention are disclosed in the present specification and the drawings, and specific terms are used, but the specific terms are used as general meanings merely for easily explaining the technical contents of the present invention and helping understand the present invention, but not intended to limit the scope of the present invention. It is obvious to those skilled in the art to which the present invention pertains that other modified embodiments may be carried out based on the technical spirit of the present invention in addition to the exemplary embodiments disclosed herein.

INDUSTRIAL AVAILABILITY

The present invention relates to a robot joint device which is possible to implement various joint angles with the parallel links rotatably installed at angles and the rotary shafts rotatably installed to operate along the three degrees of freedom and also to improve product durability.

What is claimed is:
1. A robot joint device comprising:
first and second plates positioned in parallel with each other;
links each having a first end connected to the first plate and a second end connected to the second plate;
connecting members configured to connect the first and second ends of each of the links and the first and second plates, respectively, so that angles and rotations of the links are adjustable relative to the first and second plates;
a rotary shaft having two ends penetrating the first and second plates and rotatably installed;
a gear reduction unit installed in the first plate and connected to the first end of the rotary shaft;
a pulley connected to the second end of the rotary shaft and configured to transmit driving power to the rotary shaft; and
a drive unit configured to transmit the driving power to the pulley, wherein the links are installed such that a plurality of first ends and a plurality of second ends are connected to the first and second plates, respectively, connection points of the first ends defines a first polygon, and connection points of the second ends define a second polygon, and the links are configured such that the first polygon and the second polygon are coaxially disposed while having a same size and vertices of the first and second polygons are disposed in a staggered manner such that each of the links twists while extending from the first end to the second end.

2. The robot joint device of claim 1, wherein each of the links has an anti-interference bent portion at a central portion of the link, which is spread at an angle, in order to prevent interference with another link.

3. The robot joint device of claim 1, wherein the gear reduction unit comprises:
a sun gear connected to the first end of the rotary shaft and configured to rotate together with the rotary shaft;
a ring gear fixed in the first plate and disposed concentrically with the sun gear;
planet gears installed between the sun gear and the ring gear; and
a planetary gear carrier configured to support the planet gears disposed at an equal interval.

4. The robot joint device of claim 3, further comprising:
a rotation restricting unit connected to the gear reduction unit and configured to restrict a rotation of the rotary shaft,
wherein the rotation restricting unit comprises:
an outer race installed in the first plate and having a first stopper protruding from an inner circumferential surface of the outer race;
an inner race positioned inside the inner circumferential surface of the outer race so as to be disposed concentrically with the outer race and having a second stopper formed at one side of an outer circumferential surface thereof, the inner race being connected to the planetary gear carrier and configured to rotate together with the planetary gear carrier; and
a moving block slidably disposed between the outer race and the inner race and configured to move together with the second stopper and restrict the rotation of the inner race by being caught by the first stopper.

5. The robot joint device of claim 3, wherein the two ends of the rotary shaft are connected to the sun gear and the pulley by means of universal joints, respectively.

6. A robot joint device comprising:
first, and second plates positioned in parallel with each other;
links each having a first end connected to the first plate and a second end connected to the second plate;
connecting members configured to connect the first and second ends of each of the links and the first and second plates, respectively, so that angles and rotations of the links are adjustable relative to the first and second plates;
a rotary shaft having two ends penetrating the first and second plates and rotatably installed;
a gear reduction unit installed in the first plate and connected to the first end of the rotary shaft;
a pulley connected to the second end of the rotary shaft and configured to transmit driving power to the rotary shaft; and
a drive unit configured to transmit the driving power to the pulley,
wherein the links are installed such that a plurality of first ends and a plurality of second ends are connected to the first and second plates, respectively, and connection points of the first ends and connection points of the second ends each define a polygon, and
the connecting member comprises two hinges coupled to be pivotable in perpendicular directions relative to each other.

7. A robot joint device comprising:
first and second plates positioned in parallel with each other;
links each having a first end connected to the first late and a second end connected to the second plate;
connecting members configured to connect the first and second ends of each of the links and the first and second plates, respectively, so that angles and rotations of the links are adjustable relative to the first and second plates;
a rotary shaft having two ends penetrating the first and second plates and rotatably installed;
a gear reduction unit installed in the first plate and connected to the first end of the rotary shaft;
a pulley connected to the second end of the rotary shaft and configured to transmit driving power to the rotary shaft;
a drive unit configured to transmit the driving power to the pulley;
first and second winding members provided at positions facing the first and second plates; and
a wire wound around the first and second winding members and configured to connect the first and second winding members,
wherein the links are installed such that a plurality of first ends and a plurality of second ends are connected to the first and second plates, respectively, and connection points of the first ends and connection points of the second ends each define a polygon, and
a first end of the wire is wound around the first and second winding members, a second end of the wire is wound around an outer circumferential surface of the pulley and connected to the drive unit, and a distance between the first and second winding members is changed depending on driving power of the drive unit.

8. The robot joint device of claim 7, wherein
the pulley has, at a center thereof, a cylindrical portion having an inner circumferential surface coupled to the second end of the rotary shaft, and an outer circumferential surface formed with a screw thread,
the second plate has, at a center thereof, a fastening unit having a screw thread formed on an inner circumferential surface thereof so as to correspond to the screw thread of the cylindrical portion, and
the cylindrical portion and the fastening unit are thread-coupled to each other and are configured to transmit rotational force to the rotary shaft.

9. The robot joint device of claim 8, wherein a thickness of the wire is equal to or larger than a pitch of the screw thread of the cylindrical portion.

* * * * *

UNITED STATES PATENT AND TRADEMARK OFFICE
CERTIFICATE OF CORRECTION

Page 1 of 1

PATENT NO. : 11,660,764 B2
APPLICATION NO. : 16/755592
DATED : May 30, 2023
INVENTOR(S) : Yong Jae Kim et al.

It is certified that error appears in the above-identified patent and that said Letters Patent is hereby corrected as shown below:

On the Title Page

Item (73):
Assignee: "NAVER CORPORATION", Gyeonggi-do (KR)" and "KOREA UNIVERSITY OF TECHNOLOGY AND EDUCATION INDUSTRY-UNIVERSITY COOPERATION FOUNDATION, Chungcheongnam-do (KR)"
Should read:
Assignee: --NAVER LABS CORPORATION, Gyeonggi-do (KR) and KOREA UNIVERSITY OF TECHNOLOGY AND EDUCATION INDUSTRY- UNIVERSITY COOPERATION FOUNDATION, Chungcheongnam-do (KR)--

Signed and Sealed this
Twenty-fourth Day of September, 2024

Katherine Kelly Vidal
*Director of the United States Patent and Trademark Office*